United States Patent

Ha et al.

Patent Number: 5,942,302
Date of Patent: Aug. 24, 1999

[54] POLYMER LAYER FOR OPTICAL MEDIA

[75] Inventors: Chau T. Ha, St. Paul; Wayne M. Hector, Shoreview; Cynthia J. Kwiecien, Woodbury, all of Minn.

[73] Assignee: Imation Corp., Oakdale, Minn.

[21] Appl. No.: 08/606,908

[22] Filed: Feb. 23, 1996

[51] Int. Cl.[6] .................................................. B32B 3/00
[52] U.S. Cl. ...................... 428/64.1; 428/64.4; 428/65.2; 428/913; 430/270.12; 430/495.1; 430/945; 369/283
[58] Field of Search ................................ 428/64.1, 64.2, 428/64.4, 65.2, 913; 430/270.12, 495.1, 945; 369/283, 288

[56] References Cited

U.S. PATENT DOCUMENTS

| | | | |
|---|---|---|---|
| 4,385,372 | 5/1983 | Drexler | 369/109 |
| 4,430,363 | 2/1984 | Daniels et al. | 427/54.1 |
| 4,450,553 | 5/1984 | Holster et al. | 369/275 |
| 4,493,887 | 1/1985 | Peeters et al. | 430/275 |
| 4,510,593 | 4/1985 | Daniels | 369/283 |
| 4,652,498 | 3/1987 | Wolf et al. | |
| 4,814,257 | 3/1989 | Galloway | 430/278 |
| 5,126,996 | 6/1992 | Iida et al. | 369/283 |
| 5,128,387 | 7/1992 | Shustack | |
| 5,171,392 | 12/1992 | Iida et al. | 156/273.3 |
| 5,202,875 | 4/1993 | Rosen et al. | 369/94 |
| 5,255,262 | 10/1993 | Best et al. | 369/275.1 |
| 5,303,224 | 4/1994 | Chikuma et al. | 369/275.1 |
| 5,303,225 | 4/1994 | Satoh et al. | 369/275.3 |
| 5,360,652 | 11/1994 | Kobayashi et al. | 428/64 |
| 5,578,399 | 11/1996 | Olsen | |

FOREIGN PATENT DOCUMENTS

| | | |
|---|---|---|
| 3932460 | 4/1990 | Germany. |
| 62-104817 | 5/1987 | Japan. |
| WO 96/04650 | 2/1996 | WIPO. |

*Primary Examiner*—Elizabeth Evans
*Attorney, Agent, or Firm*—Eric D. Levinson

[57] ABSTRACT

A composition suitable for use as a polymer layer disposed on a semi-reflective layer in an optical medium, such as an optical storage medium. The polymer layer includes an acidic component that promotes adhesion of the polymer layer to the semi-reflective layer.

42 Claims, 1 Drawing Sheet

POLYMER LAYER FOR OPTICAL MEDIA

FIELD OF THE INVENTION

The present invention relates to optical media, and more specifically to a polymer layer disposed on a semi-reflective layer of an optical medium.

BACKGROUND

There is a seemingly never-ending demand in the field of data storage for optical storage media (e.g., for use as pre-recorded optical disks) having increased data storage capacity and performance. Recently, optical media, such as optical storage media, have been developed that contain semi-reflective layers that increase the storage capacity of an optical storage medium by allowing the medium to contain multiple information-bearing layers. Information can be read from a semi-reflective information-bearing layer by focusing laser light on the semi-reflective layer. Alternatively, light can be transmitted through the semi-reflective layer and focused on one or more other reflective or semi-reflective information-bearing layers. Thus, two or more information-bearing layers can be accessed independently, from one side of the medium, by using a differential laser focusing lens, and data storage capacity of the optical medium is multiplied. See, for example, U.S. Pat. No. 4,450,553 (Holster et al.), and assignee's co-pending U.S. Pat. Application, U.S. Ser. No. 08/286,289, filed Aug. 5, 1994 under the title "Dual Layer Optical Medium Having Partially Reflecting Thin Film Layer" in the name of Michael B. Hintz, and having Attorney's Docket No. 50849USA6A, each of which describe optical media containing multiple information-bearing layers.

The construction of a multi-layer optical medium, in accordance with Hintz, for example, can include a substrate, a semi-reflective layer, and a polymeric spacer layer disposed on the semi-reflective layer. Because the polymer layer contacts the semi-reflective layer, there is a need in the optical media art for a polymer layer that will adhere well to such semi-reflective layers.

Besides adhering well to a semi-reflective layer, the composition of the polymer layer will affect other aspects of the performance, stability, and ultimately the usefulness of an optical medium. For instance, a polymer layer is desirably optically clear. And, the polymer layer will typically be applied to an optical medium in the form of a liquid solution that is thereafter cured or solidified. To provide efficient processing, the uncured polymer solution should be capable of being efficiently coated onto the semi-reflective layer of an optical medium to form a smooth, uniform, coating. The polymer layer desirably cures in a relatively short period of time, and once cured, the polymer layer should exhibit good adherence to the semi-reflective layer so there will be no delamination or separation over time.

SUMMARY OF THE INVENTION

The present invention provides a composition suitable for use as a polymer layer in an optical medium. The polymer layer includes an acidic component that promotes adhesion of the polymer to a semi-reflective layer. An additional advantage of the acid functionality is its ability to increase the surface energy of the cured polymer coating.

The polymer layer can comprise a cured polymer network derived from ingredients including a radiation curable material, and an acid functionality. Preferably, the polymer layer comprises a cured polymer network obtained from ingredients comprising a radiation-curable component, a polymer comprising substantially no radiation-curable functionality, and a reactive acidic molecule comprising a radiation-curable functionality and an acid functionality.

DETAILED DESCRIPTION

Figure 1:
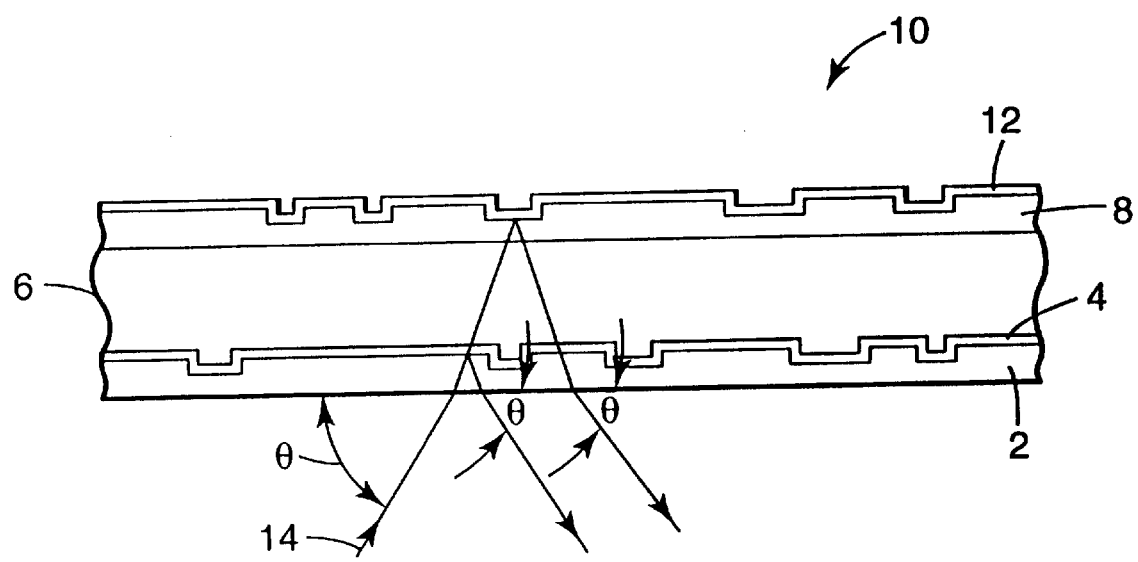
FIG. 1 illustrates a side view of a portion of a multi-layer optical medium comprising a cured polymeric spacer layer provided on a semi-reflective layer.

FIG. 1 illustrates a portion of a preferred optical medium of the present invention. Optical disk 10 of FIG. 1 is an optical storage disk comprising multiple (two) information-bearing layers. Substrate 2 comprises a polycarbonate disk having at least one information-bearing surface patterned with features representing stored information. In the Figure, patterns of features are laid down as tracks of pits and lands formed in a surface of substrate 2. Semi-reflective layer 4 is disposed on the patterned surface of substrate 2. Polymer layer 6 of the present invention is a spacer layer disposed on semi-reflective layer 4. In FIG. 1, a second information-bearing layer 8, is disposed on the other side of polymer layer 6, with reflective layer 12 being disposed on the patterned surface of information-bearing layer 8.

FIG. 1 illustrates an optical disk containing two information-bearing layers. Information can be retrieved independently from either information-bearing layer, by focusing a laser on either information bearing layer, optionally by use of only a single laser. In FIG. 1, a portion of laser light emitted by laser beam 14 can be focused on and reflect off of semi-reflective layer 4. The reflected portion can be detected to reproduce the information stored on the information-bearing surface of substrate 2. Alternatively, a portion of laser light can be transmitted through semi-reflective layer 4, and can be focused on reflective layer 12. This light can also be detected to reproduce the information stored on information-bearing layer 8. Thus, information can be retrieved from either information-bearing layer.

Although FIG. 1 illustrates an optical storage disk comprising two information-bearing layers, it will be appreciated that the optical medium of the present invention need not be in the form of an optical disk, but can be any of a number of types of optical media, such as an optical tape. A skilled artisan will further appreciate that the optical medium may comprise any number of data recording layers, e.g., one, two, three, or more. Also, although FIG. 1 illustrates a polymer layer functioning as a spacer layer disposed between two information-bearing layers, a skilled artisan will appreciate that the polymer layer of the present invention can be disposed in an optical medium in any position requiring a polymer layer having good adhesion to a semi-reflective layer.

In optical disk 10 of FIG. 1, transparent substrate 2 may be any material suitable for use as an optical disk substrate. The substrate should be capable of being patterned with features representing stored information that can be read using an appropriate optical data retrieval apparatus. Examples of useful substrate materials include polycarbonate, polymethyl methacrylate, amorphous polyolefin materials, and other materials known in the optical recording media art. Information bearing layer 8 can also be made of any of these materials, or it can be made of a photopolymer material as described below for the spacer layer, which may or may not contain an acid functionality.

In the optical medium of the present invention, the semi-reflective layer can be made of any material that, in an optical medium, will reflect an amount of light that can be detected to retrieve stored information, while transmitting an amount of light that can be reflected off of one or more other reflective or semi-reflective layers, to thereafter be detected to retrieve stored information. The reflectivity of a semi-reflective layer can be defined as the percentage of incident light reflected from the semi-reflective layer at the interface between the substrate and the semi-reflective layer. The reflectivity of the semi-reflective layer can be chosen to work with a desired optical medium, and can be particularly dependent on the number of information-bearing layers contained in the medium. For dual layer optical disks, suitable semi-reflective layers can preferably reflect from about a quarter to about a third of incident light, i.e., the semi-reflective layer can have a reflectivity in the range from about 25% to 35%. The semi-reflective layer can be of any thickness that will provide a desired reflective quality, and the thickness required to achieve a desired reflectivity will be a function of the composition of the semi-reflective layer.

Examples of materials found to be useful as semi-reflective layers include metals, semiconductors, and dielectric materials. Specific examples of useful semi-reflective materials include metals, such as gold, aluminum, and silver, silicon and silicon compounds such as $SiO_Y$, $SiC_X$, $SiC_XO_Y$, $SiN_z$, or $SiC_xN_z$, alloys of these compounds, metal oxides such as tungsten oxide, titanium oxide, and titanium dioxide, as well as others. Metals, such as gold, silver, or aluminum, however, can be less desirable for use as semi-reflective layers because the reflectivity of metals is very strong, and is highly dependent on the thickness of the metal layer. Additionally, it can be difficult to coat thin metal films of a very consistent, uniform thickness.

The semi-reflective layer used of the present invention preferably comprises an amorphous silicon carbide ($SiC_X$) material. Silicon carbide materials are preferred over metal semi-reflective layers because the reflectivity of a silicon carbide layer is less dependent on the thickness of the semi-reflective layer. Preferred "silicon carbide" or "$SiC_X$" compounds include compounds comprising silicon and carbon in amounts ranging from 30–50 atomic percent silicon, 35–60 atomic percent carbon, and 0–20 atomic percent oxygen, and having silicon-carbon stoichiometries ranging from $SiC_{0.9}$ to $SiC_{1.4}$. For example, silicon carbide materials can have approximately 42 atomic percent silicon, approximately 53 atomic percent carbon, and approximately 5 atomic percent oxygen. These types of silicon carbide compounds are described in assignee's co-pending U.S. patent application, U.S. Ser. No. 08/286289. The composition of silicon carbide materials can be measured by methods known in the art, for example by x-ray photoelectron spectroscopy.

For $SiC_X$ semi-reflective layers, useful thicknesses have been found to be in the range from about 15 nm (nanometers) to 100 nm, with preferred thicknesses being in the range, for example, from about 35 to 65 nm and with a thickness tolerance of ±6 nm. Semi-reflective layers can be deposited onto a substrate by known methods, such as by sputtering methods.

The optical recording medium of the present invention comprises a polymer layer disposed on the semi-reflective layer. The polymer layer can be comprised of any polymer material useful within an optical medium, and that will adhere to a semi-reflective layer. Typically, the polymer layer will comprise a transparent, relatively hard and durable material such as those materials known to be useful as spacer layers in multi-layer optical disks. The thickness and light transmission qualities of the polymer layer can be adjusted to meet the needs of a desired optical media application. In a multi-layer optical storage medium, for example as illustrated in FIG. 1, polymer layer 6 acts as a spacer layer to separate semi-reflective layer 4 from information-bearing layer 8. In this environment, it is preferred that the thickness and refractive index of the spacer layer allow a laser to focus independently on each of the medium information-bearing layers with a minimum of cross-talk, or interference, between the two sets of information. Also, it is preferred that the apparent reflectivities of each reflective or semi-reflective layer be approximately equal, and also be relatively insensitive to thickness variations in the spacer layer. Thus, a preferred spacer layer for use in a dual layer optical disk has a complex refractive index with a real component n ranging from about 1.45 to 1.6 and an imaginary component K of less than $10^{-4}$. This typically translates into a cured polymer layer having a physical thickness in the range from about 10 to 150 $\mu$m, preferably from about 10 to 75 $\mu$m, and more preferably from about 10 to 50 $\mu$m.

The polymer layer of the present invention comprises an acid functionality that promotes adhesion of the polymer layer to a semi-reflective layer. The acid functionality can be any chemical functionality that, due to its electrophilic nature, will be attracted to the electron-rich surface of a semi-reflective layer. While wishing not to be bound by theory it is believed that the attraction between the acid functionality and the semi-reflective layer results in the formation of a (e.g., through hydrogen bonding, vander Waals' forces, or ionic or covalent bonding) between the acid functionality and the semi-reflective layer.

In the present invention, the acid functionality can be present in the polymer layer as its own acidic molecule, the acid functionality can be pendant from a polymer molecule contained in the polymer layer, or, the acid functionality can be pendant from a polymer network contained within the polymer layer. Thus, the acid functionality bonded to the semi-reflective layer can improve adhesion of the polymer layer to the semi-reflective layer by one or more of a number of possible mechanisms.

One mechanism by which an acid functionality might improve adhesion of the polymer layer to the semi-reflective layer is by mechanical interactions between the polymer layer and the acid functionality. The polymer layer of the present invention is typically produced by coating a polymer solution onto the semi-reflective layer as an uncured polymer solution, and thereafter curing, polymerizing, or solidifying the polymer solution to form a polymer layer. In one embodiment, the uncured polymer solution containing an acid functionality such as an acid molecule can be coated onto a semi-reflective layer. The acid molecule bonds to the semi-reflective layer and the polymer solution is then cured to form a polymer network surrounding the acid molecule. The polymer network surrounding the acid molecule is mechanically linked to the acid functionality due to the physical contact between the acid functionality and the polymer network. Therefore, the cured polymer layer adheres to the semi-reflective layer.

In an alternatively embodiment, adhesion between the semi-reflective layer and the polymer layer can be improved by including in the polymer layer, a non-radiation-curable polymer molecule that comprises an acid functionality. The acid functionality bonds to the semi-reflective layer, while the remainder of the non-radiation-curable polymer molecule extends into the polymer layer and becomes entangled in other molecules of the polymer layer (e.g., a polymer network). This type of polymer layer, comprising a cured polymer network surrounding other polymer molecules, such as non-radiation-curable polymer molecules, is referred to as an interpolymer network (IPN). An interpolymer network can be formed by including a non-radiation-curable polymer molecule (optionally comprising a pendant acid functionality), in an unreacted, radiation-curable polymer solution. As the radiation-curable polymer solution cures to form a polymer network, the non-radiation-curable polymer molecule becomes entangled in the cured polymer network to produce an IPN.

In a preferred embodiment, the acid functionality of the present invention is attached directly to a polymer network contained within the polymer layer; i.e., the acid functionality is pendant from the polymer network. This provides a direct chemical linkage from the semi-reflective layer to the polymer layer because the semi-reflective layer is bonded to the acid functionality, which is bonded to a polymer network of the polymer layer. To provide such a direct chemical linkage between the semi-reflective layer and the polymer layer, the acid functionality in the uncured polymer solution can be pendant from a reactive molecule such as a monomer, oligomer, polymer or copolymer, as desired, that can react to form the cured polymer network of the polymer layer.

Examples of acid functionalities useful in the polymer layer of the present invention include compounds defined as Bronsted acids, as well as compounds defined as Lewis acids. Bronsted acid functionalities generally contain an acidic hydrogen ion, also known as a proton, that is attracted to the electron-rich surface of a semi-reflective layer. Examples of Bronsted acid functionalities include acidic compounds such as $HNO_3$, $H_2SO_4$, $H_3PO_4$, HF, HCl, HBr, HI, $NH_4^+$, and acidic groups such as —COOH, —$PO_3H$, —$PO_4H$, —$SO_3H$, —HCOCL, and —HCOBr.

Preferred Bronsted acid functionalities are those that have a proton tending to remain attached to the acid functionality; i.e., a proton that does not have a strong propensity to become separated from the acid functionality. In this case, the attached proton is attracted to the electron-rich surface of the semi-reflective layer, as described above, causing the entire acid functionality to be attracted to and bond to the semi-reflective layer. If, however, the acidic functional is a relatively strong acid, the acid has a tendency to react with other ingredients of the polymer solution, and the solution is not stable. Therefore, relatively weaker Bronsted acids are preferred over relatively stronger Bronsted acids. Preferred Bronsted acids include Bronsted acids, in a 1 molar aqueous solution, have a pH in the range from about 2 to 6 as measured using a conventional pH meter. Particularly preferred Bronsted acids include, for example, acetic acid, oxalic acid acrylic acid, and methacrylic acid.

Acid functionalities defined as Lewis acids are also useful in the polymer layer of the present invention. A Lewis acid functionality is considered to be any chemical functionality that acts as an electron pair acceptor. This definition includes a proton as described above with respect to Bronsted acids, and additionally includes other compounds that attract electrons, including compounds such as boron trifluoride ($BF_3$), aluminum trichloride ($AlCl_3$), beryllium dichloride $BeCl_2$, tin tetrachloride $SnCl_4$, boron trichloride $BCl_3$, and titanium tetra alkoxide $Ti(OR)_4$ wherein R can comprise a branched or unbranched, saturated or unsaturated, aliphatic or aromatic group.

The amount of acid functionality in the polymer layer can depend on many factors, including the composition of the polymer layer, the composition of the semi-reflective layer, the particular acid functionality used, and the desired adhesive strength of the polymer layer to the semi-reflective layer. A useful amount of acid functionality is generally any amount that improves adhesion of the polymer layer to a semi-reflective layer. On the other hand, it is preferred to use as little of the acid functionality as possible that also provides a desired level of adhesion between the polymer layer and the semi-reflective layer. Excess acid in the polymer solution can cause unwanted side reactions within the polymer solution, or between the polymer solution and the semi-reflective layer. For example, depending on the composition of the semi-reflective layer, excess acid might cause the semi-reflective layer to corrode. For semi-reflective layers comprising carbide, a useful amount of acid functionality in an polymer layer has been found to be in the range from about 0.001 to about 1.5 parts by weight acid functionality per 100 parts polymer layer, with the range from about 0.001 to 1 parts by weight being preferred.

In a preferred embodiment of the present invention, the polymer layer can be derived from a polymer solution comprising a reactive component, an acid functionality, and optionally, a non-radiation-curable polymer. The acid functionality can be attached to the reactive component, to the optional non-radiation-curable polymer, or, the acid functionality can be a separate acid compound within the polymer solution. The ingredients of the polymer solution should be capable of being combined with each other to provide a homogeneous polymer solution that provides good wetting and flow characteristics, that allows for a relatively rapid cure, and that has a viscosity allowing the solution to be effectively spin coated or screen printed, as desired, onto the semi-reflective layer of an optical medium. For example, to be spin coated, the viscosity of a polymer solution of the present invention is preferably no higher than about 100 cps (centipoise) at a temperature of 25° C. To be screen printed, the viscosity of a polymer solution of the present invention is preferably in the range from about 500 to 6000 cps at a temperature of 25° C. The polymer solution should desirably cure to provide a compositionally stable polymer layer having desired optical properties.

The reactive component of the polymer solution can be any molecule or combination of molecules that will chemically react to form a polymer network (optionally, a polymer network comprising a pendant acid functionality). Preferably, the reactive component is a radiation-curable material comprising radiation-curable functionalities that react upon exposure to ionizing radiation (e.g., ultraviolet radiation, electron beam radiation, etc.). The reactive component can contain one or more monomeric, oligomeric, polymeric and/or copolymeric radiation-curable components. It is noted that the reactive component can also contain an acid functionality, e.g., the reactive component can comprise a radiation-curable monomer, oligomer, polymer, or copolymer comprising a pendant acid functionality.

Each radiation-curable component may comprise one or more radiation-curable functionalities that will react to form a polymer network. Examples of useful radiation-curable functionalities include any unsaturated functionalities such as vinyl unsaturated groups, α,β unsaturated ketones, epoxies, (meth)acrylates, vinyl ethers, etc. Radiation-curable components found to be particularly suitable for the polymer solution of the present invention include (meth) acrylate-functional monomers and oligomers that comprise one or more (meth)acrylate groups, and have the general formula:

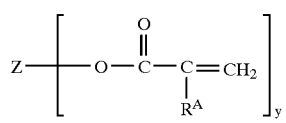

(I)

In formula I, $R^A$ is preferably hydrogen or —$CH_3$, and y is preferably in the range from about 1 to 6. As used throughout the present application, the term "(meth)acrylate" refers to both acrylate molecules (e.g., wherein $R^A$ of formula I is hydrogen) and methacrylate molecules (e.g., wherein $R^A$ of formula I is a methyl group). In formula I, the precise nature of Z is not critical, and representative Z groups include those that comprise, for example, urethanes, polyurethanes, esters, polyesters, oxyalkylene groups, epoxies, alkyl groups, aryl-containing groups, and allyl-containing groups, etc., any of which can be straight, branched, cyclic, aromatic, saturated, or unsaturated.

Most preferably, the reactive component comprises a reactive molecule of the class sometimes referred to as reactive diluents. Reactive diluents are considered to be relatively low molecular weight mono- or multi-functional reactive monomers. Reactive diluents are advantageously of a relatively low viscosity, e.g., less than about 30 centipoise at 25° C. Therefore, a reactive diluent can be added to a polymer solution to reduce viscosity. Additionally, a reactive diluent can facilitate dissolution of other ingredients of a polymer solution, including, for example, a thermoplastic material as described below.

Preferred reactive diluents include mono- and di-functional, non-aromatic (meth)acrylate molecules. Mono-functional reactive diluents are preferred because they have a tendency to cause less shrinkage upon cure. This is because shrinkage can be caused by the cure reaction of individual reactive groups. When fewer reactive groups are present in the solution, fewer shrinkage-causing reactions occur, resulting in a more volume-stable composition. Examples of preferred monofunctional reactive diluents include isobornyl (meth)acrylate (IBOA, UCB Radcure), 2(2-ethoxyethoxy) ethyl (meth)acrylate (sold under the trade name Sartomer 256 from SARTOMER Company, Inc. of Exton, Pa.), n-vinyl formamide (Sartomer 497), tetrahydrofurfuryl (meth)acrylate (Sartomer 285) and mixtures thereof. On the other hand, di-functional reactive diluents are generally preferred as well because di-functional reactive diluents, by providing an increased concentration of reactive groups, generally provide for a more rapid cure than mono-functional reactive diluents. Preferred di-functional (meth)acrylate reactive diluents include 1,6-hexanediol di(meth)acrylate (HDODA from UCB Radcure, Inc. of Smyrna, Ga.), tripropylene glycol di(meth)acrylate (UCB Radcure), polyethylene glycol di(meth)acrylate (Sartomer 344), neopentyl glycol dialkoxy di(meth)acrylate, polyethyleneglycol di(meth)acrylate, and mixtures thereof To balance the need for low shrinkage and rapid cure, the polymer solution of the present invention most preferably comprises a mixture of at least one monofunctional reactive diluent and at least one difunctional reactive diluent. A preferred mixture of reactive diluents comprises 1,6-hexandiol diacrylate and 2(2-ethoxyethoxy) ethyl (meth)acrylate.

The polymer solution of the present invention can include any amount of reactive component found to be useful in producing a polymer layer. For reactive diluents such as the preferred reactive diluents described above, the polymer solution can contain from about 10 to 90 parts by weight of the reactive diluent, and preferably contains from about 30 to 70 parts by weight of the reactive diluent, based on 100 parts of the polymer solution.

The polymer solution of the present invention optionally, but preferably, includes a polymer material that does not react with the radiation-curable component. Although this polymer material, referred to herein as a "non-radiation-curable" polymer, does not react with the reactive component of the polymer solution, as discussed above a non-radiation-curable polymer can become surrounded by and entangled in a cured polymer network, to form an interpolymer network.

Useful non-radiation-curable polymer materials include thermoplastic materials. "Thermoplastic" refers to a polymer material that will soften when exposed to heat, and will solidify as the temperature of the material is reduced. For example it is well known in the polymer art that a thermoplastic can flow as a liquid when heated, but will return to a solid phase as the temperature is reduced below a glass transition temperature (Tg).

A thermoplastic can be added to a polymer solution to modify the morphological and/or the rheological properties of a polymer solution, and also to modify the properties of the cured polymer layer. For instance, a thermoplastic can be added to a polymer solution to modify the viscosity of the polymer solution, to provide a polymer solution having a viscosity suitable for spin coating or screen printing. Additionally, a thermoplastic might be added to a polymer solution in order to reduce shrinkage of the polymer solution during cure. A polymer solution comprising a thermoplastic will tend to experience less shrinkage as the polymer layer cures, because a thermoplastic does not take part in a volume-reducing chemical reaction.

Suitable thermoplastics can be thermoplastics that modify the morphology or rheology of an uncured polymer solution, or that modify properties of the cured polymer layer. Generally, useful thermoplastics comprise relatively high molecular weight polymer molecules. Examples of useful thermoplastics include poly(meth)acrylates, polyimides, polyurethanes, polyvinylchlorides, polyalkylenes such as polyethylene or polypropylene, polyalkenes such as polybutadiene, etc.

Poly(meth)acrylate materials are generally preferred thermoplastics because poly(meth)acrylates have superior wettability and solubility when used with the other ingredients of the polymer solution of the present invention, and, because poly(meth)acrylates, when used in combination with the preferred (meth)acrylate radiation-curable materials described above, provide a cured interpolymer network that exhibits excellent transparency. Preferred poly(meth)acrylate thermoplastics include polymers and copolymers prepared from (meth)acrylate monomers such as methyl (meth)acrylate, ethyl ethacrylate, butyl (meth)acrylate, n-butyl (meth)acrylate, and isobutyl (meth)acrylate. These thermoplastics are commercially available from, for example, ICI Acrylic of Wilmington, Del. Particularly preferred thermoplastics include (meth)acrylate copolymer resins commercially available from ICI Acrylics under the trade name Elvacite, including Elvacite 2028, Elvacite 2016 and Elvacite 2013, and ethyl (meth)acrylate acrylic resins such as Elvacite 2043, also commercially available from ICI.

The polymer solution of the present invention may include any amount of non-radiation-curable polymer material found to be useful in producing a polymer layer. For non-radiationcurable polymer materials such as thermoplastics, the polymer solution can contain from about 5 to 60 parts by weight thermoplastic, and preferably contains from about 20 to 40 parts by weight thermoplastic, based on 100 parts of the polymer solution.

In a most preferred embodiment of the present invention, the polymer solution further comprises a radiation-curable monomer comprising a radiation-curable functionality and an acid functionality; referred to herein as an "acidic radiation-curable monomer." The acidic radiation-curable monomer may comprise one or more acid functionalities, and one or more radiation-curable functionalities. As the polymer solution cures, the acidic radiation-curable monomer reacts with other radiation curable molecules to produce a polymer network comprising pendant acidic functionalities.

Examples of useful radiation-curable functionalities include unsaturated functionalities such as vinyl unsaturated groups, α,β-unsaturated ketones, epoxies, (meth)acrylates, etc. A type of acidic radiation-curable molecule that has been found to be suitable for use in the present invention includes acidic (meth)acrylate-functional monomers and oligomers comprising an acid functionality and one or more (meth) acrylate groups, and having the general formula:

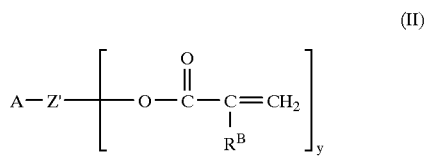

(II)

In formula II, A is an acid functionality, $R^B$ is preferably hydrogen or —$CH_3$, and y is preferably in the range from about 1 to 6. The precise nature of Z' is not critical, and representative Z' groups include those that comprise, for example, urethanes, polyurethanes, esters, polyesters, oxyalkylene groups, epoxies, alkyl groups, aryl-containing groups, and allyl-containing groups, etc., any of which can be straight, branched, cyclic, aromatic, saturated, or unsaturated.

Examples of preferred acidic radiation-curable molecules include acidic phosphate ester triacrylate, commercially available from 3M Co. under the trade name $PEA_3$; trifunctional acidic ester CD-9015 (commercially available from Sartomer); β-carboxyethyl acrylate (commercially available from UCB-Radcure); methacrylate acidic EB-169 (commercially available from UCB-Radcure); and acrylated acidic EB-170 (commercially available from UCB-Radcure).

The polymer solution can contain any amount of the acidic radiation-curable molecule that can be useful in producing a polymer layer. Preferably, the polymer solution contains from about 0.01 to 2 parts by weight of the acidic radiation-curable molecule, based on 100 parts polymer solution, with the range from about 0.2 to 1 parts by weight being most preferred.

The polymer layer of the present invention preferably further comprises a photoinitiator or combination of photoinitiators that facilitate cure of the polymer solution. Preferred pliotoinitiators can be activated by ionizing radiation, for example through an α-cleavage reaction, to yield a propagating radical that will result in curing of the radiation curable components of the polymer solution. The photoinitiators used to cure the preferred polymer solutions of the present invention are typically activated by radiation in the range of wavelengths from about 250 to 500 nm.

Examples of preferred photoinitiators include acetophenones, benzophenones, alpha-amino acetophenone, and other such molecules that are known in the art to facilitate cure of radiation-curable systems. Commercially available photoinitiators include 2-hydroxy-2-methyl-1-phenyl-propane-1-one (commercially available from Ciba-Geigy of Ardsley, N.Y., under the trade name Darocure 1173); 1-hydroxycyclohexyl phenyl ketone (Irgacure 184 from Ciba-Geigy), 2-benzyl-2-N,N-dimethylamino-1-(4-morpholinophenyl)-1-(Irgacure 369 from Ciba-Geigy), 2,2-dimethoxy-2-phenylacetophenone, (Irgacure 651 from Ciba-Geigy) 2-hydroxy-2methyl-1-phenylpropane-1-one and 2,4,6[trimethylbenzoyidiphenyl pliosphine]oxide (Darocure 4265, Ciba-Geigy); 2-methyl-1-[4-(methylthio) phenyl]-2-morpholinopropanone (Irgacure 907).

Most preferably, the uncured polymer solution of the present invention comprises a mixture of photoinitiators. A mixture of two or more photoinitiators provides efficiency in curing the polymer solution by providing a rapid cure and a complete cure; a binary system of photoinitiators will provide good surface cure as well as good through cure (cure through the depth of the polymer layer). The binary system of 2-hydroxy-2-methyl-1-phenyl-propane-1-one, and 2,2dimethoxy-2phenylacetophenone is most preferable.

The photoinitiator can be present in any amount that facilitates cure of the reactive components of the polymer solution to form a cured polymer network. It is preferable, however, to use as little photoinitiator as possible. The photoinitiator is preferably present in the range from about 0.5 to 15 parts by weight, and is most preferably present in the range from about 2 to 6 parts by weight, based on 100 parts of the unreacted polymer solution. For the binary system of 2-hydroxy-2-methyl-1-phenyl-propane-1-one, and 2,2-dimethoxy-2-phenylacetophenone, amounts in the range from 4 to 6 parts by weight of the binary mixture of photoinitiators, based on 100 parts polymer solution, are preferred.

The polymer solution can be applied to a semi-reflective layer of an optical medium by techniques known in the optical media art, such as spin coating methods and screen printing methods. According to spin coating techniques, a polymer solution is prepared and delivered to the semi-reflective layer of an optical medium. The polymer solution can be dispensed by a manual method, or automatically, by an apparatus such as a needle and syringe, and optionally a pump. Preferably, an in-line filter (0.1 to 20 $\mu$m) is used to remove particles from the polymer solution before the solution is allowed to pass through the dispensing needle. Also preferably, the substrate disk to be coated is pre-cleaned with ionized air prior to spin-coating. A small amount of the polymer solution can be delivered to the center of the disk while the disk is spinning at 30 to 50 rpm. After delivery, a high spin-off speed of 1800 to 3500 rpm for 3 to 5 seconds disperses the solution into a thin coating.

A disadvantage of spin coating is that a spin-coated polymer layer may not be of a suitably uniform thickness. Spin coating methods tend to produce coated polymer layers that are relatively thinner at the center, and relatively thicker at the outer edges of a disk. Although the thickness gradient is acceptable for many purposes, it is preferred for some applications to have a more uniform polymer layer. This is especially true for applications such as spacer layers between multi-layer optical storage disks.

The polymer layer of the present invention is therefore preferably disposed onto the semi-reflective layer by screen printing methods, because screen printing methods provide a very uniform coated polymer layer. Screen printing methods are known in the art, and generally include the steps of placing a screen over an optical disk substrate, delivering a polymer solution to the surface of the screen, and using a squeegee to squeeze the polymer solution through the screen to the surface of the substrate. Each screen printing pass can deposit a layer of polymer solution having a thickness in the range from about 3.5 to 20 μm; and the thickness deposited can be controlled by the screen mesh used. In order to provide greater thicknesses, multiple passes must be performed, with curing steps between each pass.

If a polymer layer is to be disposed onto a substrate by means of a multiple-pass screen printing technique, each layer of the multi-layer polymer layer must be capable of accepting and adhering to a screen printed polymer layer coated thereon. It has been found that a surface energy of a cured polymer layer of above about 40 dynes/cm will facilitate wetting of a screen printed polymer solution onto the cured polymer layer. Therefore, it is preferred that a cured polymer layer have a surface energy of at least 40 dyne/cm in order to facilitate multiple pass screen printing of the polymer layer. It has also been observed that the acid functionality provided in the polymer layer of the present invention increases the surface energy of the cured polymer layer.

The coated polymer solution of the present invention can be cured using an appropriate form of radiation, such as electron beam radiation or ultraviolet radiation. It is preferred that the polymer solution be photocurable, e.g., curable with ultraviolet (UV) radiation. Various sources of UV radiation are suitable, including electric powered arc lamps, such as medium pressure or high pressure mercury lamps; and, electrodeless lamps, such as H-type, D-type, or V-type metal halide lamps. The specific radiation source should be selected to correspond to the absorption spectra of any included photoinitiator. As an example, a UV radiation source operating at wavelengths of between 200 to 500 nm and an energy of 20 to 450 mj/cm$^2$ for from 1 to 6 seconds would be preferable in the practice of the present invention in combination with the above-described preferred binary mixture of photoinitiators. Preferably, coating and/or curing of the polymer solution occurs in an inert atmosphere, for example in an atmosphere comprising 90% or more nitrogen.

The present invention is illustrated by the following non-limiting examples. Although the following examples relate to multi-layer optical storage disks, one skilled in the art will appreciate that the polymer layer of the present invention will be useful for any application requiring increased adhesion of a polymer layer to a partially reflective layer within an optical medium.

EXAMPLES

Sample polymer solutions were prepared according to the formulations described in Table 1. The solutions were prepared by the following method.

The reactive diluents and thermoplastic materials were placed in a container and mixed using a table shaker until the thermoplastic was completely dissolved. The acidic compound (where used) and photoinitiators were then added, and the mixture was shaken again until homogeneous. The mixture was then allowed to stand for a half hour to degas.

The polymer solutions were screen printed onto the SiC$_x$ surface of an optical disk, using a single head screen printer from Systematic Automation of Boston, Mass. The polymer layer was cured using a 300 Watt per inch (118 Watt per cm) model F300-6 Fusion lamp (commercially available from Fusion UV Curing Systems Corp. of Rolling Meadows, Ill.), equipped with an H-type or D-type bulb for about 1 to 6 seconds to provide a "tack-free" surface. Three to six layers were applied, to produce a spacer layer having a total physical thickness of between 36 to 50 μm.

TABLE 1

| Components | Sample 1 | Sample 2 | Sample 3 | Sample 4 | Sample 5 |
|---|---|---|---|---|---|
| 1,6-hexanediol diacrylate (HDDA) | 40 | 35 | 36 | 36 | 40 |
| 2(2-ethoxyethoxy) ethylacrylate | 28 | 27 | 28 | | 28 |
| Tripropylene glycol diacrylate | | | | 28 | |
| Methacrylate copolymer acrylic resin Elvacite 2028 | 26 | | | 29.6 | 26 |
| Ethyl methacrylate acrylic resin Elvacite 2043 | | 31 | | | |
| Methacrylate copolymer acrylic resin Elvacite 2013 | | | 30 | | |
| β-Carboxymethyl acrylate | | 1 | | | |
| Methacrylate acidic EB-169 | 1 | | 1 | 1 | |
| Darocure 1173 | 3 | 3 | 3 | 3 | 3 |
| Irgacure 651 | 2 | | 2 | 2 | 2 |
| Irgacure 184 | | 3 | | | |
| Viscosity at 25° C. (cps) | 625 | 2664 | 1043 | 4104 | 625 |

The adhesion, environmental stability, and surface tension of the cured polymer layer samples were evaluated. The adhesion of the polymer layer to a semi-reflective (SiCx) surface was evaluated using ASTM test method D 3359-93. The results are summarized in Table 2.

TABLE 2

| | Adhesion results |
|---|---|
| Sample 1 | 5B |
| Control 1 | 0B |
| Control 2 | 0B |
| Sample 5 | 0B |

In Table 2, a value of 5B indicates that the cured spacer layer did not separate from the SiC$_x$ surface; a value of 0B indicates that the cured spacer layer completely separated from the SiC$_x$ surface. The results show that Sample 1, which contained an acid functionality, adhered very well to the SiC$_x$ surface. On the other hand, Control #1 (Commercialized screen printable clear product 9720-Commercially available from 3M Company), Control #2 (described in U.S. Pat. No. 4,510,593, to Daniels), and Sample 5, none of which contained an acidic functionality, did not adhere well to the SiC$_x$ surface.

It is believed that a polymer layer that adheres well to a semi-reflective layer will provide environmentally stable optical disks that will not delaminate over time and will therefore retain data. This assumption was evaluated using the ZAD test method found in IEC Publication 67-2-38. The ZAD test is a cyclic temperature and humidity test designed to detect defects at the interface between the semi-reflective layer and the polymer layer caused by breathing, as distinct from the absorption of moisture. Results of these tests are given in Table 3.

TABLE 3

| Polymer Layer | ZAD results |
|---|---|
| Sample 1 | no delamination, no cracking, or no crazing ("orange peel"-type structure) |
| Sample 2 | delamination, cracking and crazing were observed. |
| Sample 5 | Delamination, cracking and crazing observed between polymer layer and semi-reflective layer. |

Table 3 shows that polymer layers of Sample 1 provides good environmental performance. Sample 1 provides strong adhesion between the polymer layer and the $SiC_x$ surface thereby eliminating interfacial separation of the polymer layer and the $SiC_x$ surface under environmental stress.

The surface energy of cured polymer layers of the present invention were tested and compared to polymer layers that did not include an acid functionality. Surface energy was tested using a calibrated liquid pen set, available from Control Cure Inc., of Chicago, Ill.

TABLE 4

| | Surface Energy (dynes/cm) |
|---|---|
| Sample 1 | 44–48 |
| Sample 2 | 44 |
| Sample 3 | 48 |
| Sample 4 | 44–48 |
| Sample 5 | 38 |

The surface energy data of Table 4 demonstrate that cured polymer layer Samples 1 through 4, all containing an acid functionality, have higher surface energies than Sample 5, which contains no acid functionality. This relatively higher surface energy provides for improved wetting of a polymer solution onto the cured polymer layer, which in turn facilitates multi-layer screen printing, and increases the adhesion between the multiple layers. Polymer layer Samples 1 through 4 will therefore be suitable for multiple pass screen printing processes.

What is claimed is:

1. A pre-recorded optical storage medium comprising:
  a transparent substrate having a pattern of features provided on one major surface thereof, the pattern of features representative of stored information;
  a semi-reflective layer provided on the pattern of features;
  a multilayered polymeric spacer layer provided on the semi-reflective layer;
  a second layer comprising a pattern of features representative of stored information, the second layer being provided on the polymer layer; and
  a highly reflective layer provided on the second layer; wherein (i) each layer of the Polymeric spacer layer exhibits a surface energy in excess of 40 dynes/cm, and (ii) the polymeric spacer layer comprises an acid functionality to promote adhesion of the polymer layer to the semi-reflective layer.

2. The optical storage medium of claim 1, wherein the semi-reflective layer comprises one or more of a metal, a semiconductor, or a dielectric material.

3. The optical storage medium of claim 2, wherein the semi-reflective layer comprises silicon carbide.

4. The optical storage medium of claim 1, wherein the polymeric spacer layer comprises a polymer network comprising pendant acid functionalities.

5. The optical storage medium of claim 1, wherein the polymeric spacer layer comprises an interpolymer network comprising a non-radiation-curable polymer entangled in a polymer network, wherein the acid functionality is pendant from the polymer network.

6. The optical storage medium of claim 1, wherein the polymeric spacer layer comprises an interpolymer network comprising a non-radiation-curable polymer entangled in a polymer network, wherein the acid functionality is pendant from the nonradiation-curable polymer.

7. The optical storage medium of claim 1, wherein the acid functionality comprises an acid compound chosen from the group consisting of $HNO_3$, $H_2SO_4$, $H_3PO_4$, HF, HCl, HBr, HI, $NH_4^+$, $BF_3$, $AlCl_3$, $Ti(OR)_4$ wherein R is an aliphatic group, $BeCl_2$, $SnCl_4$, $BCl_3$, a carboxylic acid, a (meth)acrylic acid, acetic acid, oxalic acid, and combinations thereof.

8. The optical storage medium of claim 1, wherein the acid functionality is chosen from the group consisting of —COOH, —$PO_3H$, —$PO_4H$, —$SO_3H$, —HCOCl, —HCOBr, an acrylic acid functionality, and combinations thereof.

9. The optical storage medium of claim 1, wherein the polymeric spacer layer comprises from about 0.001 to about 1.5 parts by weight of the acid functionality, based on 100 parts of the polymer layer.

10. The optical storage medium of claim 9, wherein the polymeric spacer layer comprises from about 0.001 to about 1 parts by weight of the acid functionality, based on 100 parts of the polymer layer.

11. The optical storage medium of claim 1, wherein the polymeric spacer layer comprises a cured polymer network obtained from ingredients comprising:
  a radiation-curable material; and
  an acid functionality to promote adhesion of the polymer layer to the semi-reflective layer.

12. The optical storage medium of claim 11, wherein the radiation-curable material comprises a (meth)acrylate functionality.

13. The optical storage medium of claim 11, wherein the acid functionality is an acid compound chosen from the group consisting of $HNO_3$, $H_2SO_4$, $H_3PO_4$, HF, HCl, HBr, HI, $NH_4^+$, $BF_3$, $AlCl_3$, $Ti(OR)_4$ wherein R is an aliphatic group, $BeCl_2$, $SnCl]_4$, $BCl_3$, a carboxylic acid, a (meth) acrylic acid, acetic acid, oxalic acid, and combinations thereof.

14. The optical storage medium of claim 11, wherein the acid functionality is chosen from the group consisting of —COOH, —$PO_3H$, —$PO_4H$, —$SO_3H$, —HCOCl, —HCOBr, an acrylic acid functionality, and combinations thereof.

15. The optical storage medium of claim 11, wherein the acid functionality is pendant from the radiation-curable material.

16. The optical storage medium of claim 11, wherein the polymeric spacer layer further comprises a non-radiation-curable polymer.

17. The optical storage medium of claim 16, wherein the non-radiation-curable polymer comprises a thermoplastic.

18. The optical storage medium of claim 17, wherein the thermoplastic is chosen from the group consisting of a poly(meth)acrylate, a polyimide, a polyurethane, a polyvinyl chloride, a polyalkylene, a polyalkene, and mixtures thereof.

19. The optical storage medium of claim 11, wherein the acid functionality is pendant from the non-radiation-curable polymer.

20. The optical storage medium of claim 11 wherein the polymeric spacer layer comprises from about 0.001 to about 1.5 parts by weight percent of the acid functionality, based on 100 parts of the polymer layer.

21. The optical storage medium of claim 20, wherein the polymeric spacer layer comprises from about 0.001 to about 1 parts by weight of the acid functionality.

22. The optical storage medium of claim 1, wherein the polymeric spacer layer comprises an inter-polymer network obtained from ingredients comprising:

a) a radiation-curable material;

b) a non-radiation-curable polymer; and c) an acidic radiation-curable molecule comprising a radiation-curable functionality and an acid functionality.

23. The optical storage medium of claim 22, wherein the radiation-curable material comprises a reactive diluent comprising a (meth)acrylate functionality.

24. The optical storage medium of claim 23, wherein the reactive diluent is chosen from the group consisting of 1,6-hexanediol diacrylate and 2(2-ethoxyethoxy) ethacrylate, and mixtures thereof.

25. The optical storage medium of claim 22, wherein the non-radiation-curable polymer comprises a thermoplastic.

26. The optical storage medium of claim 25, wherein the thermoplastic is chosen from the group consisting of a poly(meth)acrylate, a polyimide, a polyurethane, a polyvinyl chloride, a polyalkylene, a polyalkene, and mixtures thereof.

27. The optical storage medium of claim 22, wherein the acidic radiation-curable molecule comprises an acid functionality and a radiation-curable functionality, the radiation-curable functionality being chosen from the group consisting of an α,β-unsaturated ketone, an epoxy, a (meth)acrylate, and combinations thereof.

28. The optical storage medium of claim 27, wherein the acidic radiation-curable molecule comprises an acid functionality and a (meth)acrylate functionality.

29. The optical storage medium of claim 22, wherein the acidic radiation-curable —molecule comprises a pendant acidic functionality chosen from the group consisting of —COOH, —PO$_3$H, —PO$_4$H, —SO$_3$H, —HCOCl, —HCOBr, a (meth)acrylic acid functionality, and combinations thereof.

30. The optical storage medium of claim 22, wherein the acidic radiation-curable molecule is chosen from the group consisting of an acidic phosphate ester tri(meth)acrylate, a trifunctional acidic ester, a β-carboxyethyl acrylate, and mixtures thereof.

31. The optical storage medium of claim 22, wherein the interpolymer network is obtained from ingredients comprising from 0.01 to 2 parts by weight acidic radiation-curable molecules, based on 100 parts reactive diluent, thermoplastic material, and reactive acidic molecules.

32. The optical storage medium of claim 22, wherein the interpolymer network is obtained from ingredients further comprising a photoinitiator.

33. The optical storage medium of claim 32, wherein the photoinitiator is chosen from the group consisting of: 2-hydroxy-2-methyl-1-phenyl-propane-1-one, 1-hydroxycyclohexyl phenyl ketone, 2-benzyl-2-N,N-dimethylamino-1-(4-morpholinophenyl)-1-butanone, 2,2-dimethoxy-2-phenylacetophenone, and mixtures thereof.

34. The optical storage medium of claim 33, wherein the photoinitiator is a mixture comprising 2-hydroxy-2-methyl-1-phenyl-propane-1-one, and 2,2-dimethoxy-2-phenylacetophenone.

35. The optical storage medium of claim 22, wherein the inter-polymer network is obtained from ingredients comprising:

from 10 to 70 parts by weight of the reactive diluent;

from 5 to 60 parts by weight of the thermoplastic;

from 0.01 to 2 parts by weight of the acidic radiation-curable molecule; and from 0.5 to 15 parts by weight of the photoinitiator.

36. The optical storage medium of claim 35, wherein:

the reactive diluent is a mixture of 1,6-hexanediol diacrylate and 2(2ethoxyethoxy)ethacrylate;

the thermoplastic comprises a (meth)acrylate copolymer;

the acidic radiation-curable molecule comprises a (meth)acrylic acid oligomer; and the photoinitiator comprises a mixture comprising 2-hydroxy-2-methyl-1-phenyl-propane-1-one, and 2,2-dimethoxy-2-phenylacetophenone.

37. The optical storage medium of claim 1 wherein the semi-reflective layer comprises a material selected from the group consisting of one or more of gold, silver, silicon, silicon compounds, and metal oxides.

38. The optical storage medium of claim 1 wherein the polymeric spacer layer has a thickness of 10 to 150 μm.

39. The optical storage medium of claim 1 wherein the semi-reflective layer comprises one or more of a semiconductor or a dielectric material.

40. An optical storage medium of the type comprising a multilayered polymer layer disposed on a semi-reflective layer, wherein (i) each layer of the polymer layer exhibits a surface energy in excess of 40 dynes/cm, and (ii) the polymer layer comprises an acid functionality to promote adhesion of the polymer layer to the semi-reflective layer and the semi-reflective layer comprises one or more of a semiconductor or a dielectric material.

41. The medium of claim 40 wherein the semiconductor material comprises silicon carbide.

42. An optical storage medium of the type comprising a multilayered polymer layer disposed on a semi-reflective layer, wherein (i) each layer of the polymer layer exhibits a surface energy in excess of 40 dynes/cm, and (ii) the polymer layer comprises an acid functionality to promote adhesion of the polymer layer to the semi-reflective layer and the semi-reflective layer comprises a material selected from the group consisting of one or more of gold, silver, silicon, silicon compounds, and metal oxides.

* * * * *